(12) United States Patent
Ribarov

(10) Patent No.: US 9,827,530 B2
(45) Date of Patent: Nov. 28, 2017

(54) ENHANCED DEVICE FOR SEPARATION OF OXYGEN AND NITROGEN

(71) Applicant: Hamilton Sundstrand Corporation, Windsor Locks, CT (US)

(72) Inventor: Lubomir A. Ribarov, West Hartford, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 172 days.

(21) Appl. No.: 14/610,621

(22) Filed: Jan. 30, 2015

(65) Prior Publication Data

US 2016/0220950 A1 Aug. 4, 2016

(51) Int. Cl.
*B01D 53/22* (2006.01)
*B01D 63/02* (2006.01)
*B64D 37/32* (2006.01)

(52) U.S. Cl.
CPC ............. *B01D 53/22* (2013.01); *B01D 63/02* (2013.01); *B01D 2053/224* (2013.01); *B01D 2256/10* (2013.01); *B01D 2256/12* (2013.01); *B01D 2257/102* (2013.01); *B01D 2257/104* (2013.01); *B01D 2259/4575* (2013.01); *B64D 37/32* (2013.01)

(58) Field of Classification Search
CPC ................ B01D 63/02; B01D 2256/12; B01D 2259/4575; B01D 53/22; B01D 2256/10; B01D 2257/104; B01D 2257/102; B01D 2053/224; B64D 37/32
See application file for complete search history.

(56) References Cited

U.S. PATENT DOCUMENTS

| | | | | | |
|---|---|---|---|---|---|
| 2,393,788 | A | * | 1/1946 | Lofgren | A47L 7/04 15/DIG. 8 |
| 4,350,507 | A | * | 9/1982 | Greenough | A62B 23/00 128/201.25 |
| 4,631,077 | A | * | 12/1986 | Spicer | B01D 39/14 55/487 |

(Continued)

FOREIGN PATENT DOCUMENTS

| | | |
|---|---|---|
| DE | 102009049732 A1 | 4/2011 |
| EP | 1108458 A1 | 6/2001 |
| WO | 0228714 A1 | 4/2002 |

OTHER PUBLICATIONS

Machine Translation of DE102009049732 (A1)—Apr. 21, 2011 FROEHLICH.*

(Continued)

*Primary Examiner* — Anthony Shumate
(74) *Attorney, Agent, or Firm* — Cantor Colburn LLP

(57) ABSTRACT

A device is disclosed for separating nitrogen and oxygen. The device includes an inlet in fluid communication with a source of a gas comprising oxygen and nitrogen, a membrane having a greater permeability to oxygen than to nitrogen. One side of the membrane is in fluid communication with the inlet, and the other side of the membrane is in fluid communication with an outlet for nitrogen-enriched gas. An outlet for oxygen-enriched gas is also in fluid communication with the first side of the membrane. A porous metal foam is disposed between the inlet and the membrane.

11 Claims, 3 Drawing Sheets

(56) References Cited

U.S. PATENT DOCUMENTS

| | | | | |
|---|---|---|---|---|
| 4,842,829 A * | 6/1989 | Hirai | | A61L 9/015 250/435 |
| 5,106,802 A * | 4/1992 | Horiuchi | | B01D 53/944 502/302 |
| 5,330,559 A * | 7/1994 | Cheney | | B03C 3/155 95/63 |
| 2001/0030127 A1* | 10/2001 | Li | | B01D 53/228 204/252 |
| 2005/0092181 A1 | 5/2005 | Shih | | |
| 2005/0103193 A1* | 5/2005 | Lyons | | B01D 53/22 95/54 |
| 2005/0178891 A1* | 8/2005 | Dennis | | B64D 33/08 244/57 |
| 2006/0164617 A1* | 7/2006 | Nagahashi | | G03F 7/70341 355/53 |
| 2006/0228606 A1* | 10/2006 | Fiebig | | H01M 8/0297 429/410 |
| 2007/0081911 A1* | 4/2007 | Charles | | B22F 3/1125 419/2 |
| 2008/0087167 A1* | 4/2008 | Wright | | B01D 53/22 96/4 |
| 2008/0169449 A1* | 7/2008 | Mundschau | | B01D 69/141 252/373 |
| 2009/0010801 A1* | 1/2009 | Murphy | | B01D 46/0028 422/4 |
| 2009/0100809 A1* | 4/2009 | Baldwin, Jr. | | B01D 39/2051 55/318 |
| 2009/0183636 A1* | 7/2009 | Levine | | B01D 46/10 96/397 |
| 2009/0185962 A1* | 7/2009 | Saberi | | F01N 3/0222 422/180 |
| 2010/0297531 A1* | 11/2010 | Liu | | B01D 61/38 429/498 |
| 2011/0059355 A1* | 3/2011 | Zhang | | H01M 4/8647 429/188 |
| 2011/0059364 A1* | 3/2011 | Zhang | | H01M 4/0404 429/231.8 |
| 2012/0040254 A1* | 2/2012 | Amendola | | C25B 11/035 429/406 |
| 2013/0145748 A1* | 6/2013 | Shimizu | | F02M 25/032 60/274 |
| 2014/0116249 A1* | 5/2014 | Evosevich | | B01D 63/02 95/47 |
| 2014/0311340 A1* | 10/2014 | Snow, Jr. | | B64D 37/00 95/45 |

OTHER PUBLICATIONS

Extended European search report for related European application No. 16153295.7, dated: Jun. 24, 2016, pp. 8.

\* cited by examiner

ENHANCED DEVICE FOR SEPARATION OF OXYGEN AND NITROGEN

BACKGROUND OF THE INVENTION

Various devices have been utilized over time for the separation of nitrogen and oxygen from air. Many such devices rely on a membrane that is exposed to pressurized air, such that oxygen molecules preferentially (compared to the larger nitrogen molecules) diffuse through the membrane, resulting in an oxygen-enriched gas on one side of the membrane and a nitrogen-rich gas on the other side of the membrane. These gases are also referred to as oxygen-enriched air (OEA) and nitrogen-enriched air (NEA), respectively. The effectiveness of membranes at performing the task of separating gases can be characterized by a trade-off that membranes experience between permeability of the membrane to the gas molecules targeted for diffusion across the membrane versus selectivity of the membrane between the targeted gas molecules and other molecules in the gas mixture.

There are, of course, many uses for OEA or NEA, so there are a variety of applications for devices that separate oxygen and nitrogen, including but not limited to medical oxygen concentrators, atmospheric oxygen supplementation systems, and NEA-based combustion suppression systems. In recent years, commercial and other aircraft have been equipped with fuel tank suppression systems that introduce NEA into a fuel tank headspace or ullage, often by bubbling NEA through the liquid fuel. Such systems require NEA with a nitrogen concentration of at least 90% by volume, and attempt to minimize payload weight and size while maintaining target NEA output across a wide variety of operating conditions.

It is recognized that fuel vapors within fuel tanks become combustible in the presence of oxygen. An inerting system decreases the probability of combustion of flammable fuel vapors in a fuel tank by maintaining a chemically non-reactive or inert gas, such as nitrogen, in the fuel tank vapor space also known as ullage. Three elements are required to initiate and sustain combustion: an ignition source (e.g., heat, electrostatic spark, etc.), fuel, and oxidizer (e.g., oxygen). Combustion may be prevented by reducing any one of these three elements. If the presence of an ignition source cannot be prevented within a fuel tank, then the tank may be made inert by: 1) reducing the oxygen concentration threshold, 2) reducing the fuel concentration of the ullage to below the lower explosive limit (LEL), or 3) increasing the fuel concentration to above the upper explosive limit (UEL). Many systems reduce the risk of combustion by reducing the oxygen concentration by introducing an inert gas such as nitrogen to the ullage, thereby displacing some of the oxygen in the fuel tank with nitrogen.

Membrane devices offer many advantages for use in aircraft applications to provide a source of NEA. However, service life of membrane devices for separating oxygen and nitrogen can be limited by the polymers used in the gas separation module. These polymers are susceptible to damage by air-borne contaminants in the media flow including but not limited to hydrocarbons (HCs), liquid or solid aerosols. Contaminants can affect the service life of the membrane in several ways. Liquid/solid particulates can plug the membrane. Liquids can soak the membrane causing swelling, distortion, and, ultimately structural failure of the affected membrane. Various acids and solvents can damage the inner walls of the composite or layered membranes, causing delamination and membrane deformation. Prolonged exposure to heavy HCs can lead to degradation, cracking, and structural damage of the polymer materials used in forming the membranes.

Contamination of the gas separation membrane can be a problem in any operating environment, but can be particularly problematic for on-board aircraft applications. More specifically, air-borne contaminants may include (but are not limited to): residue products from jet fuel, engine lubricating oil, hydraulic fluid, de-icing fluid, and various ambient pollutants in the atmosphere (exhausts from other aircraft, smog, acid rain, etc.). Especially damaging to the membrane can be contaminants such as ketones, acids, and aldehydes. In general, membranes are susceptible to damage from large hydrocarbon molecules such as those commonly found in the complex combustion products of typical jet fuel-powered aircraft engines.

BRIEF DESCRIPTION OF THE INVENTION

According to some aspects of the invention, a device for separating nitrogen and oxygen comprises an inlet in fluid communication with a source of a gas comprising oxygen and nitrogen, a membrane having a greater permeability to oxygen than to nitrogen, and having a first and a second side, with the first side in fluid communication with the inlet, an outlet for nitrogen-enriched gas in fluid communication with the second side of the membrane, an outlet for oxygen-enriched gas in fluid communication with the first side of the membrane, and a porous metal foam between the inlet and the membrane.

According to some aspects of the invention, a method separating oxygen from nitrogen comprises passing a gas comprising nitrogen and oxygen through a porous metal foam, delivering the gas exiting the porous metal foam to a first side of a membrane having a greater permeability to oxygen than to nitrogen, and diffusing oxygen in the gas through the membrane to a second side of the membrane to produce an oxygen-enriched gas on the second side of the membrane and a nitrogen-enriched gas on the first side of the membrane.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying figures, in which:

DETAILED DESCRIPTION OF THE INVENTION

Figure 1:
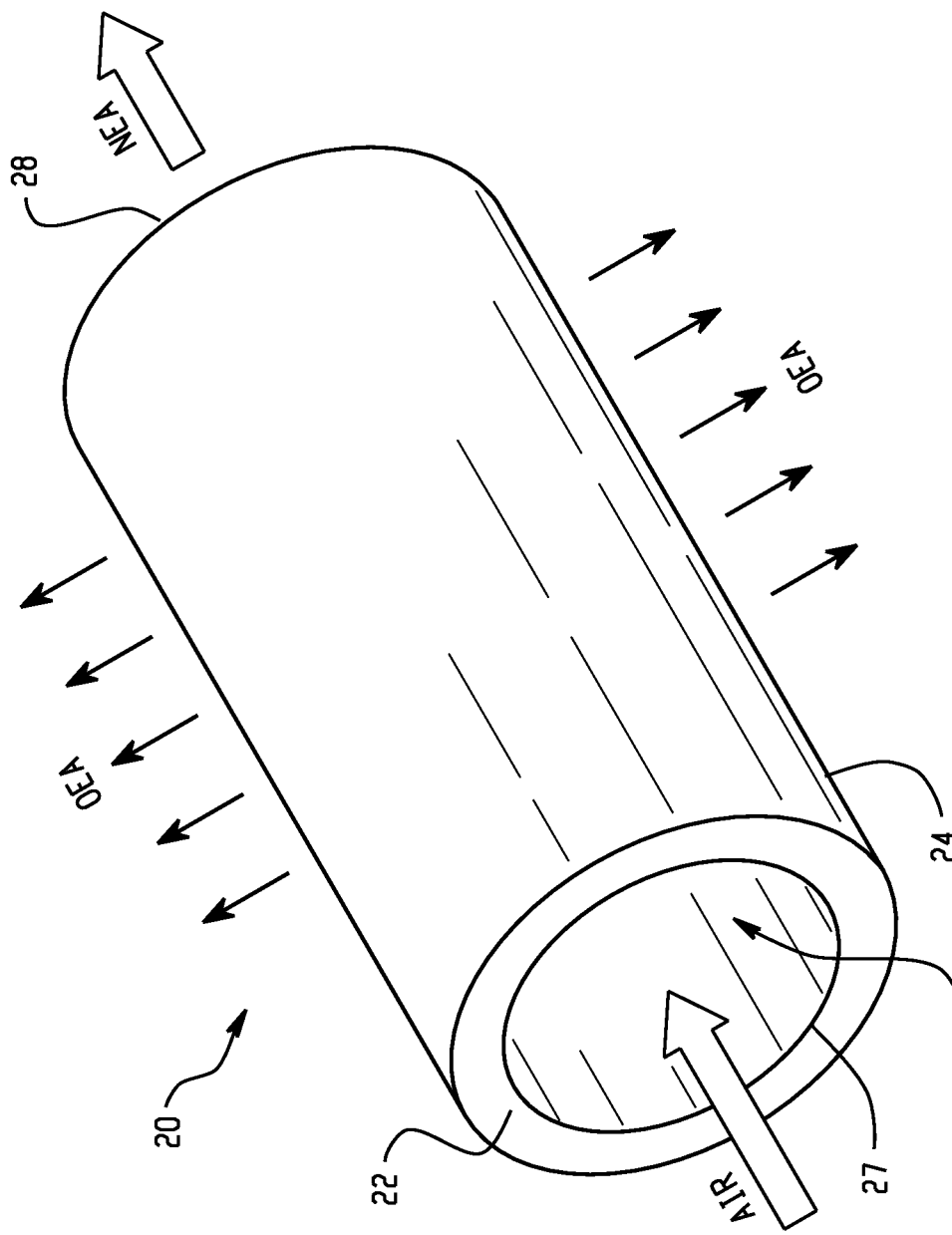
FIG. 1 is a schematic depiction of an exemplary tubular membrane for separating nitrogen and oxygen.

With reference to the Figures, FIG. 1 schematically depicts an exemplary membrane for separating nitrogen and oxygen. FIG. 1 depicts a tubular membrane, but other configurations such as planar membranes can also be used. As shown in FIG. 1, tubular membrane 20 comprises a tubular shell 22. The membrane 20 can be fabricated from a material that has selective permeability to oxygen compared to nitrogen such that a pressure differential across the membrane provided by a gas comprising nitrogen and oxygen on the high-pressure side of the membrane will preferentially diffuse oxygen molecules across the membrane. For ease of illustration, the membrane 20 is depicted as a monolithic hollow shell, and membranes fabricated solely out of the selective oxygen-permeable membrane material are included within the scope of this invention. However, in many cases, the membrane is a composite of a substrate or layer that is permeable to both oxygen and nitrogen and a substrate or layer that is selectively permeable to oxygen.

The shell 22 defines a hollow core 26 that is open at both ends. In use, pressurized gas comprising nitrogen and oxygen (e.g., air which is known to also contain trace amounts of noble/inert gases) is delivered into the hollow core 26 at an inlet end 27 of the membrane 20. The pressure of the air is greater than air outside the core 26 such that a pressure differential between the hollow core 26 and air at the exterior 24 of the membrane 20 exists. Oxygen molecules preferentially diffuse through the tubular membrane 20 compared to nitrogen molecules, resulting in a flow of OEA from the outer surface of the tubular membrane 20 as shown in FIG. 1, and a flow of NEA from the hollow core 26 at the outlet end 28 of the membrane 20 as shown in FIG. 1.

As described above, a porous metal foam is disposed in the flow of air before it contacts the membrane 20. Porous metal foams are commercially available offering a wide variety of configurations and properties. Porous metal foams used herein should be sufficiently porous to meet the gas pressure and flow rate requirements for the membrane air separator. Although these requirements can vary widely, in some exemplary embodiments, the porous metal foam can be an open-cell foam with a pore density of about 50 pores/inch (0.508 mm pore size) to about 200 pores/inch (0.127 mm pore size) (pore counts are specified per linear inch as observed on the surface of the foam). The pores can be irregular or they can be configured in a regular configuration, depending on the fabrication technique. In some embodiments, the porous metal foam is heated by flowing electric current through it, and the foam should provide a level of electrical conductivity and heat transfer characteristics conducive to such heating. In some exemplary embodiments, the porous metal foam is a screen having an electrical conductivity, $\sigma$, of from about $3 \times 10^4$ Siemens/m to about $1 \times 10^6$ Siemens/m measured laterally along the screen. In some exemplary embodiments, the porous metal foam has a thermal conductivity, k, of from about 0.3 W/(m·K) to 35 W/(m·K) and relatively low density from about 0.4 g/cm$^3$ to about 0.9 g/cm$^3$.

A wide variety of metals and metal alloys can be used in the porous metal foams as described herein, including but not limited to Fe—Cr—Al, Ni—Cr, Al—SiC, Al—Ca, Al—TiH, etc. The porous metal foams can be fabricated by a variety of techniques, including but not limited to coating or impregnating a polymer foam with a slurry of a metal powder in a liquid carrier, drying off the liquid, and sintering the metal powder. The heat of the sintering process also pyrolyzes the polymer foam, leaving a metal foam based off of the polymer foam template. Other techniques, such as metal vapor deposition or electroless plating, can also be used to coat or impregnate a polymer foam with metal, followed by heating step to pyrolyze the polymer foam.

Figure 2:
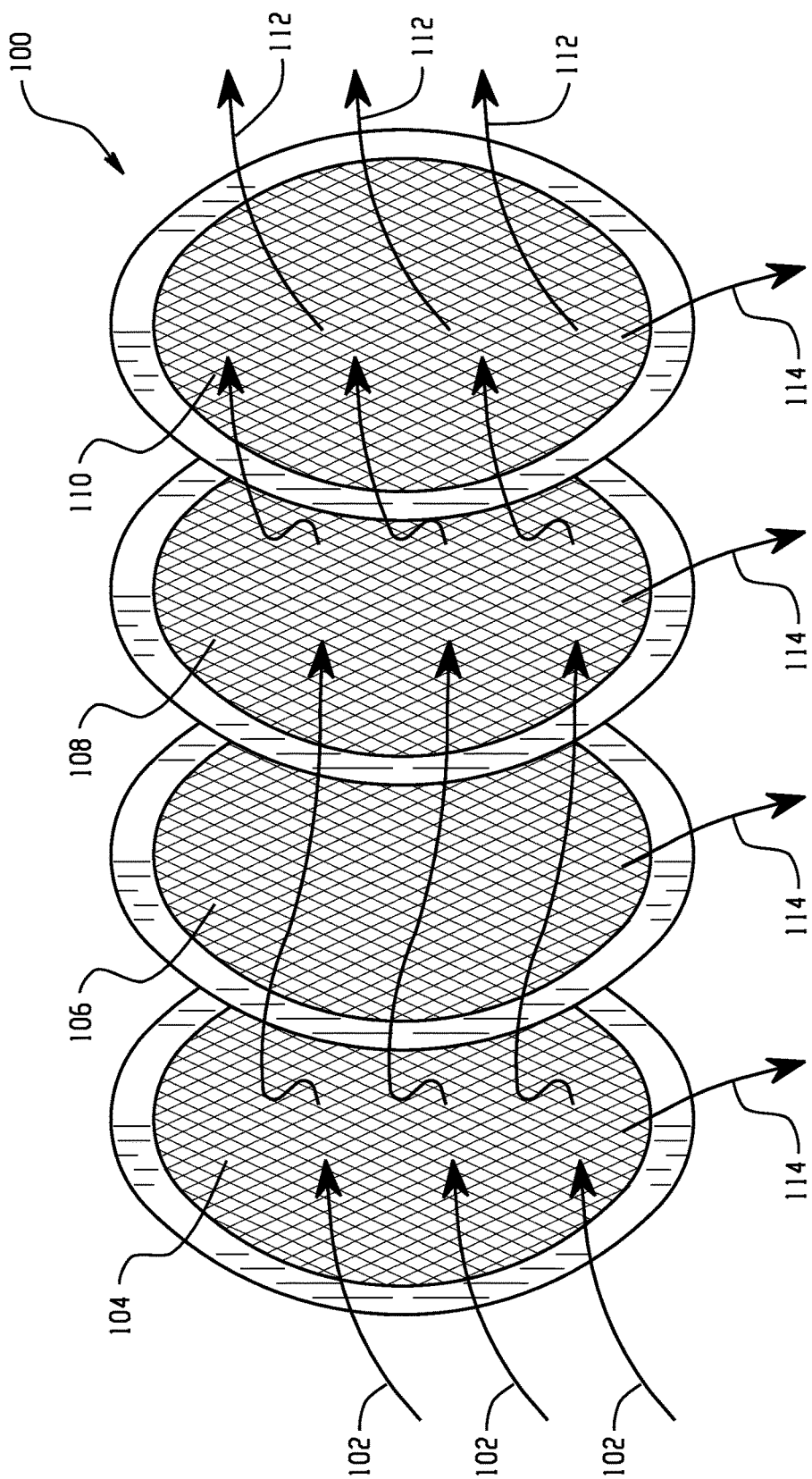
FIG. 2 is a schematic depiction of an exemplary configuration of a porous metal foam for use in conjunction with a membrane for separating nitrogen and oxygen.

The porous metal foam can be deployed as a monolithic brick or as a thin screen or series of screens. Porous metal foam screens can have a wide range of thicknesses, and in some exemplary embodiments have a thickness of from about 0.5 mm to 5 mm. FIG. 2 depicts an exemplary embodiment of a series of porous metal foam screens 100. As shown in FIG. 2, air 102 flowing toward a membrane air separator passes through porous metal foam screens 104, 106, 108, and 110 before exiting as decontaminated air 112. Contaminants 114 are removed from the air and, unlike many conventional filters, they are not retained by the metal foam, but are instead released as shown in FIG. 2. Solid contaminants that strike a metal surface on the foam screen tend to bounce off and fall away. Liquid contaminants can be removed by applying an electric current to heat the porous metal foam screen sufficiently high to evaporate the liquid or reduce its viscosity so that it flows off of the screen as part of contaminants 114 shown in FIG. 2. Solid or liquid contaminants that penetrate through a pore in the porous metal foam screen can be removed by any of the successive screens, with a sufficient number of screens in series to achieve target contaminant levels. If the screens utilize a regular pore pattern, they can be each successively angularly offset so that the pores do not line up with one another in order to increase the effectiveness of the screens lined up in series.

Figure 3:
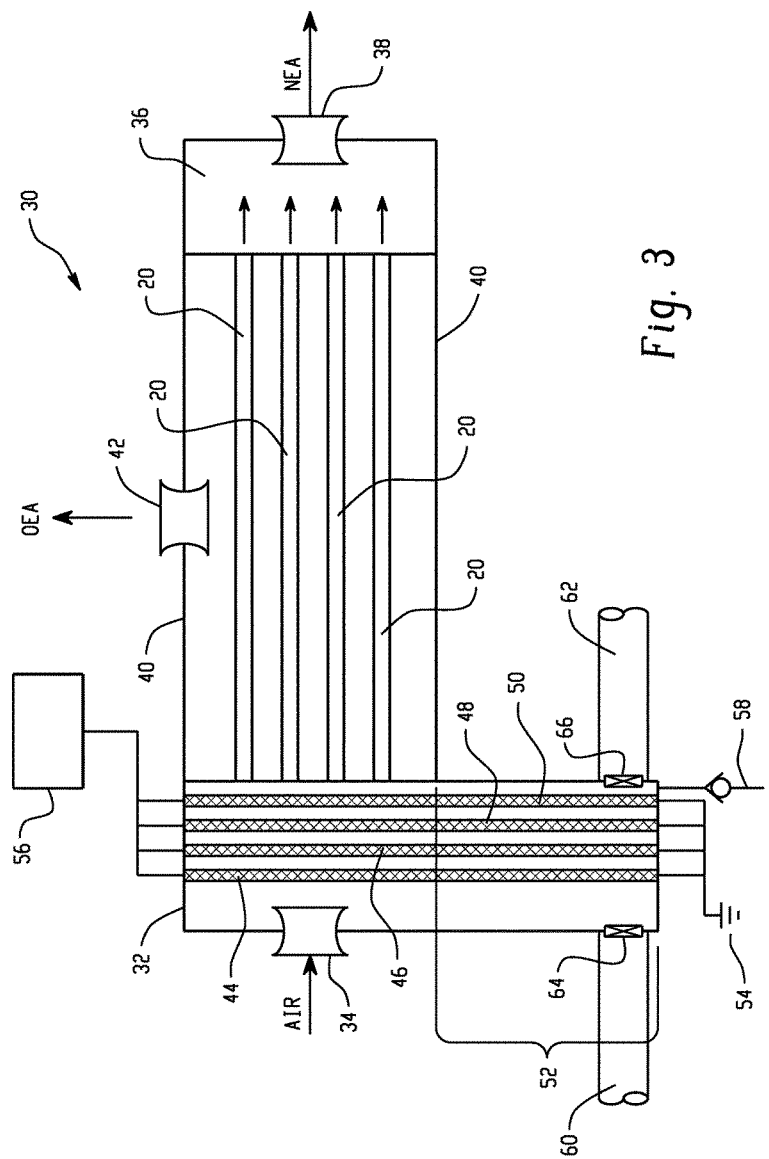
FIG. 3 is a schematic depiction of an exemplary device for separating oxygen and nitrogen.

Turning now to FIG. 3, a device 30 comprising multiple tubular membranes 20 for separating oxygen and nitrogen is schematically depicted. As shown in FIG. 3, a device 30 for separating oxygen and nitrogen has an intake plenum 32 with inlet 34 for receiving air from an air source (not shown) such as a compressor or vehicle air intake. Air in the intake plenum flows into the hollow cores 26 (FIG. 1) of tubular membranes 20 towards discharge plenum 36, where it is collected and discharged through NEA outlet 38. Oxygen flowing through the hollow cores 26 of the tubular membranes 20 preferentially (versus nitrogen) diffuses through the tubular membranes 20, so that the gas discharged into discharge plenum 36 is nitrogen enhanced. A housing 40 is disposed around the tubular membranes 20 and forms a sealed connection with the intake plenum 32 and the discharge plenum 36. The tubular membranes 20 also form sealed connections at each end with the intake plenum 32 and discharge plenum 36, respectively, so that housing 40 together with the inner surfaces of the plenums 32, 36 forms a chamber for collecting oxygen-enhanced air, which is discharged through OEA outlet 42. It will be appreciated that, based on the guidance provided herein, one skilled in the art would set component sizes (e.g., core and outside fiber diameters), number of fibers, etc., and also to set operating parameters such as control valve settings at the inlet and the outlets to provide pressure differentials and gas flow amounts to achieve a target gas diffusion profile through the membranes.

As further shown in FIG. 3, a series of metal screens 44, 46, 48, and 50 is disposed in the airflow path prior to its entry into the tubular membranes 20. The housing of the plenum 32 is extended to section 52 below the airflow path for collection and accumulation of debris. The porous metal foam screens 44, 46, 48, and 50 are each electrically connected to a ground 54 at one end and to DC power source and controller 56 at the other end. It should be noted that these electrical connections are depicted as for a square or rectangularly-shaped screen, and that different electrical connection locations would be used for other configurations such as for round screens. In some exemplary embodiments, the controller 56 controls the electric current applied to the porous metal foam screens to achieve a target temperature. In some exemplary embodiments, a target temperature is at least 5° C. in order to ensure melting of any water-containing contaminants. Temperature of the screens can be detected and controlled by treating the screens as resistance temperature detector (RTD) where temperature as a function of electrical resistance across the screen is known so that the controller 56 measures electrical resistance across the screen and controls the current to achieve a target electrical resistance representative of temperature. In some exemplary embodiments, the controller utilizes pulse width modulation (PWM) to control the electric current applied to the porous metal foam screens, where square wave periodic pulses of current are applied with level of heating controlled by varying the duration of the pulses (i.e., the width of the pulses when plotted as electrical current (y-axis) versus time (x-axis)). The controller 56 can be a stand-alone controller or it can be networked with a system controller such as an aircraft master controller or subsystem controller. For example, in some embodiments the controller 56 receives a NEA demand signal from another controller such as a master controller or a fuel system management controller, or the controller 56 could be the fuel system management controller having connections to other fuel system components besides those depicted in FIG. 3.

Depending on the contaminant levels in the air expected over the life of the device, the section 52 may be sufficient to collect contaminants for the life of the device or of a porous metal foam screen module without being evacuated or cleaned. In some exemplary embodiments, however, an optional drain with a simple non-return (check) valve 58 (which can optionally be controlled by controller 56) is disposed at the end of the plenum section 52 for removing accumulated liquid contaminants. Accumulated solid contaminants can be removed over time by decomposition promoted by repeated cycles of heating the porous metal foam screens. Solid components can be removed from the section 52 with an optional high speed air or liquid cleaning flushing stream flowing through optional valved conduit openings 60 and 62 controlled by controller 56 during a recycle stage performed when there is no system demand for NEA production. In cases of severe solid particle accumulation, the depicted design could be altered so that the porous metal foam screens do not extend past the openings 60 and 62 having valves 64 and 66 respectively. In this regard, it should be noted that the porous metal foam screens 44, 46, 48, 50 are depicted in FIG. 3 extending to the bottom of section 52 of the plenum housing 32, which can provide robust electrical connection as well as the capability of applying repeated heat cycles to decompose or evaporate accumulated contaminants in the section 52. However, embodiments are also contemplated where the porous metal foam screens do not extend or extend only partway into section 52, or where there is no section 52 present.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A nitrogen and oxygen separator device, comprising
   an inlet in fluid communication with a source of a gas comprising oxygen and nitrogen;
   a membrane having a greater permeability to oxygen than to nitrogen, and having a first and a second side, with the first side in fluid communication with the inlet;
   a nitrogen-enriched gas outlet in fluid communication with the first side of the membrane;
   an oxygen-enriched gas outlet in fluid communication with the second side of the membrane;
   a porous metal foam between the inlet and the membrane; and
   a controller electrically connected to the porous metal foam and configured to control the delivery of the electrical current through the porous metal foam with pulse width modulation to heat the porous metal foam.

2. The device of claim 1, wherein the membrane comprises a hollow polymer fiber configured as a polymer shell surrounding a hollow core, the hollow core extending from one end of the fiber to the other end of the fiber and open at one end of the fiber to receive a flow of the gas and open at the opposite end of the fiber to discharge a flow of nitrogen-enriched air.

3. The device of claim 2, comprising a plurality of said hollow polymer fibers arranged in parallel between first and second plenums such that the hollow core of each fiber is in fluid communication with one of the plenums at each end of the fiber, wherein the first plenum is configured to deliver a flow of pressurized air into the hollow core of each of the plurality of fibers, and the second plenum is configured to receive a flow of nitrogen-enriched air from each of the plurality of fibers.

4. The device of claim 1, wherein the porous metal foam is configured as a screen having a thickness of 0.5 mm to 5 mm.

5. The device of claim 1, wherein the porous metal foam has a pore sizes from 0.127 mm to 0.508 mm.

6. The device of claim 1, further comprising a collection trap and drain configured to collect and remove contaminants from the porous metal foam.

7. The device of claim 1, wherein the device includes a temperature sensor for measuring temperature of the porous metal foam or the gas exiting the porous metal foam, and the controller is configured to control the delivery of the electrical current through the porous metal foam to achieve a target temperature.

8. The device of claim 7, wherein the target temperature of the porous metal foam surface is at least 5° C.

9. A method for separating oxygen from nitrogen, comprising
   passing a gas comprising nitrogen and oxygen through a porous metal foam;
   heating the porous metal foam by passing electrical current with pulse width modulation through the porous metal foam;
   delivering the gas exiting the metal foam to a first side of a membrane having a greater permeability to oxygen than to nitrogen; and
   diffusing oxygen in the gas through the membrane to a second side of the membrane to produce an oxygen-enriched gas on the second side of the membrane and a nitrogen-enriched gas on the first side of the membrane.

10. The method of claim 9, further comprising delivering the nitrogen enriched gas to an aircraft fuel tank ullage space.

11. The device of claim 1, wherein gas on the first side of the membrane is at a higher pressure than gas on the second side of the membrane.

* * * * *